Feb. 20, 1923.

J. H. G. BOYLE 1,445,819

EDUCATIONAL DEVICE

Filed Dec. 22, 1920

Inventor.
Jennie Hartwell Genevieve Boyle

Patented Feb. 20, 1923.

1,445,819

UNITED STATES PATENT OFFICE.

JENNIE HARTWELL GENEVIEVE BOYLE, OF SAN FRANCISCO, CALIFORNIA.

EDUCATIONAL DEVICE.

Application filed December 22, 1920. Serial No. 432,618.

*To all whom it may concern:*

Be it known that I, JENNIE HARTWELL GENEVIEVE BOYLE, a citizen of the United States, and a resident of San Francisco, in the county of San Francisco and State of California, have invented a new and useful Educational Device, of which the following is a specification.

My invention relates to educational devices and has reference more particularly to a device or appliance for teaching spelling, recognition of words, forming of words and the meaning of words.

The primary object of the invention is to provide a simple device which will appeal especially to younger children to such an extent that their interests will be stimulated and aroused and their attention centered on the subject, thus providing an easy method of teaching.

In the accompanying drawing I have selected the preferred form of the device as an illustration.

In said drawing:—

Figure 1:
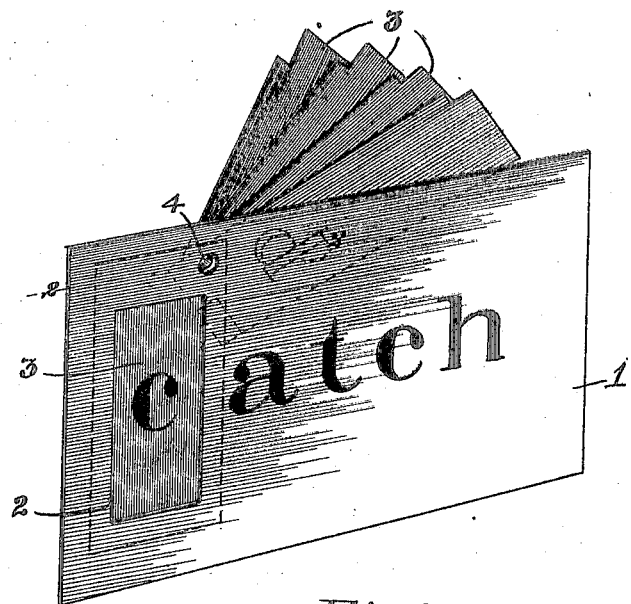
Figure 1 is a perspective view.

Referring to the drawing in detail (1) represents a suitable surface for displaying the incomplete or partly spelled word to be used as a basis for the examples. This incomplete word should preferably consist of letters of the alphabet which are formed in several words of more or less the same general sound; for instance the words, "latch" "hatch" "patch" "match" etc. are spelled the same with exception of the first letter which changes their entire meaning. In using words of this kind the first letters of the words may be interchangeable and so arranged as to enable them to be brought into use in connective order to complete the spelling of the various words.

To accomplish this the surface in front of the incomplete word is produced with an opening (2) with a plurality of cards or slips (3) hinged as at (4) to the back of the surface and adapted to be selectively swung across the opening and with the missing first letter of the word on the face of each of the cards.

Considering the cards to include the letters "H" "L" "P" "M" etc., they may be selectively brought into use to spell the words "hatch" "latch" "patch" or "match." I consider this interchangeable feature of the first letter of the word used to be quite amusing to children and it will, therefore, render the device extremely instructive for the purpose stated.

Each one of the cards is notched along one of its edges to provide an index as at (5). This index on each card comprises an index letter on the back of each card corresponding to the letter on the face of the card to be displayed through the opening (2).

Figure 2:
Figure 2 is a cross section on the line 2—2 Figure 1.
Figure 3:
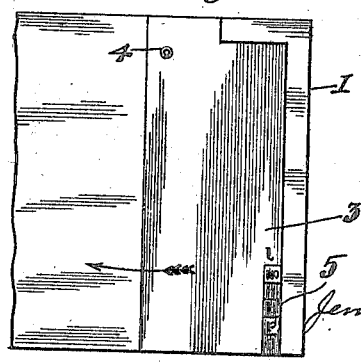
Figure 3 is a rear view.

The normal position of the cards is best shown in Figures 2 and 3. When a letter is to be displayed through the opening (2) for instance the letter C, the other cards are moved away so as to leave only this card over the openings. The other cards may be moved to a position as shown in Figure 1 to accomplish this purpose.

I do not limit myself to the use of words where it is only necessary to change the first letter to spell a word with a different meaning, as it is obvious that other words may be selected which require a change in the last letter, or any other letter or letters or in the addition of one or more letters.

I claim:

A device of the class described, including a display surface produced from a sheet of material having certain letters of the alphabet displayed on the face thereof which represent an incomplete spelling of several words, an opening in the display surface in front of said letters, a plurality of cards pivotally connected to the back of the display surface adapted to be selectively moved across said opening, each card having a letter or letters on the face thereof, adapted to be displayed through said opening in association with the letters on the display surface to complete the spelling of a word, the lower vertical edge of each card being cut away with the cuts successively increasing in length from the innermost card to the outer one, to leave relatively small areas of the cards' surfaces exposed and letters displayed on said exposed areas corresponding to the aforesaid letters on the front of the cards; whereby an index is provided for the cards substantially as and for the purpose described.

JENNIE HARTWELL GENEVIEVE BOYLE.